United States Patent
Amos-Reichert et al.

(10) Patent No.: US 11,826,739 B2
(45) Date of Patent: Nov. 28, 2023

(54) METHOD FOR FORMING A CATALYST ARTICLE

(71) Applicants: Johnson Matthey Public Limited Company, London (GB); Johnson Matthey Catalysts (Germany) GMBH, Redwitz an der Rodach (DE)

(72) Inventors: Nikki Jane Amos-Reichert, Redwitz an der Rodach (DE); Daniel Avis, Royston (GB); Juergen Bauer, Redwitz an der Rodach (DE); Yannick Bidal, Royston (GB); Guy Richard Chandler, Royston (GB); Alexander Nicholas Michael Green, Royston (GB); Neil Greenham, Royston (GB); Matthew Eben Harris, Royston (GB); Sofia Lopez-Orozco, Redwitz an der Rodach (DE); Joerg Werner Muench, Redwitz an der Rodach (DE); Paul Richard Phillips, Royston (GB); Irene Piras, Redwitz an der Rodach (DE)

( * ) Notice: Subject to any disclaimer, the term of this patent is extended or adjusted under 35 U.S.C. 154(b) by 64 days.

(21) Appl. No.: 17/302,346

(22) Filed: Apr. 30, 2021

(65) Prior Publication Data
US 2021/0339234 A1    Nov. 4, 2021

(30) Foreign Application Priority Data
Apr. 30, 2020    (EP) .................................... 20172398

(51) Int. Cl.
*B01J 29/76*    (2006.01)
*B01J 35/04*    (2006.01)
(Continued)

(52) U.S. Cl.
CPC ............. *B01J 29/76* (2013.01); *B01J 29/763* (2013.01); *B01J 35/04* (2013.01); *B01J 37/0009* (2013.01);
(Continued)

(58) Field of Classification Search
CPC ........ B01J 29/04; B01J 29/70; B01J 29/7015; B01J 29/72; B01J 29/76; B01J 29/763;
(Continued)

(56) References Cited

U.S. PATENT DOCUMENTS

| 5,430,000 A | 7/1995 | Timken |
| 5,589,147 A | 12/1996 | Farnos et al. |

(Continued)

FOREIGN PATENT DOCUMENTS

| GB | 2493449 A | 2/2013 |
| GB | 2511706 A | 9/2014 |

(Continued)

OTHER PUBLICATIONS

Murzin, D.Y., 2013, Engineering Catalysis, De Gruyter, 364 pp. (Office action cites pp. 157-158). (Year: 2013).*

(Continued)

*Primary Examiner* — Brian A McCaig

(57) ABSTRACT

The present disclosure relates to a method for forming a catalyst article comprising: (a) forming a plastic mixture having a solids content of greater than 50% by weight by mixing together a crystalline small pore or medium pore molecular sieve in an $H^+$ or $NH_4^+$ form, an insoluble active metal precursor, an inorganic matrix component, an organic auxiliary agent, an aqueous solvent and optionally inorganic fibres; (b) moulding the plastic mixture into a shaped article; and (c) calcining the shaped article to form a solid catalyst body. The present disclosure further relates to a catalyst article, particularly a catalyst article which is suitable for use (Continued)

in the selective catalytic reduction of nitrogen oxides, and to an exhaust system.

15 Claims, 2 Drawing Sheets

(51) Int. Cl.
*B01J 37/00* (2006.01)
*B01J 37/04* (2006.01)
*B01J 37/08* (2006.01)
*F01N 3/20* (2006.01)
*F01N 3/28* (2006.01)

(52) U.S. Cl.
CPC ............ *B01J 37/04* (2013.01); *B01J 37/082* (2013.01); *F01N 3/2066* (2013.01); *F01N 3/2803* (2013.01); *F01N 2330/20* (2013.01); *F01N 2370/04* (2013.01); *F01N 2610/00* (2013.01)

(58) Field of Classification Search
CPC .... B01J 35/04; B01J 37/0009; B01J 37/0018; B01J 37/04; B01J 37/08; B01J 37/082; B01J 53/9418; B01J 2229/18; B01J 2229/20; B01J 2229/42; F01N 3/2066; F01N 3/2803; F01N 2330/20; F01N 2370/04; F01N 2610/00; B01D 2251/2062; B01D 2255/20761; B01D 2255/2092; B01D 2255/30; B01D 2255/50
See application file for complete search history.

(56) References Cited

U.S. PATENT DOCUMENTS

2017/0087513 A1* 3/2017 Chandler ................ B01J 23/83
2018/0093255 A1 4/2018 Chen et al.

FOREIGN PATENT DOCUMENTS

GB 2522435 A 7/2015
WO WO2011/073398 * 6/2011 ............. B01J 29/76

OTHER PUBLICATIONS

Han et al., "Selective Catalytic Reduction of Nox with NH3 by Using Novel Catalysts: State of the Art and Future Prospects", Chemical Reviews, 2019, 119, pp. 10916-10976.

* cited by examiner

METHOD FOR FORMING A CATALYST ARTICLE

FIELD OF THE INVENTION

The present invention relates to a method for forming a catalyst article. In particular, the present invention relates to a method for forming a catalyst article suitable for use in the selective catalytic reduction of nitrogen oxides (NOx) in an exhaust gas.

BACKGROUND OF THE INVENTION

Large numbers of catalytic converters used for the treatment of emissions from mobile and stationary sources are manufactured each year. Catalytic converters for use in motor-vehicles typically comprise an extruded ceramic honeycomb monolith that is provided with channels for the through-flow of exhaust gases. The channels of the monolith may be coated with a catalytically active material (known as a "washcoat"). Alternatively, the extruded monolith itself is formed of a catalytically active material (referred to as an "all-active extrudate" or "extruded catalyst").

To produce an all-active extrudate, the catalytically active component is included in an extrusion composition whose rheological properties have been set so as to be suitable for the extrusion process. This extrusion composition is a plastic (i.e. easily shaped or mouldable), viscous composition. To set the desired rheological properties of the extrusion composition and also the mechanical properties of the extrudate, binders or additives are typically added to the extrusion composition. This plastic composition is then subjected to an extrusion process for preparing, for example, a honeycomb body. The so-called "green" body thus obtained is then subjected to a high temperature calcination treatment to form the finished extruded catalyst body.

All-active extrudates generally comprise a unitary structure in the form of a honeycomb having uniform-sized and parallel channels extending from a first end to a second end thereof. Generally, the channels are open at both the first and second ends—a so-called "flow through" configuration. Alternatively, channels at a first, upstream end can be plugged, e.g. with a suitable ceramic cement, and channels not plugged at the first, upstream end can also be plugged at a second, downstream end to form a so-called wall-flow filter.

The selective catalytic reduction of nitrogen oxides ($NO_x$) by ammonia ($NH_3$-SCR) is considered to be the most practical and efficient technology for the abatement of $NO_x$ from exhaust gases emitted from stationary sources and mobile engines, principally diesel engines for vehicles such as automobiles, trucks, locomotives and ships.

Known SCR (selective catalytic reduction) catalysts include molecular sieves. Useful molecular sieves include crystalline or quasi-crystalline materials which can be, for example aluminosilicates (zeolites) or silicoaluminophosphates (SAPOs). Such molecular sieves are constructed of repeating $SiO_4$, $AlO_4$, and optionally $PO_4$ tetrahedral units linked together, for example in rings, to form frameworks having regular intra-crystalline cavities and channels of molecular dimensions. The specific arrangement of tetrahedral units (ring members) gives rise to the molecular sieve's framework, and by convention, each unique framework is assigned a unique three-letter code (e.g., "CHA") by the International Zeolite Association (IZA). Examples of molecular sieve frameworks that are known SCR catalysts include Framework Type Codes CHA (chabazite), BEA (beta), MOR (mordenite), AEI, MFI and LTA.

Molecular sieves (e.g. zeolites) may also be categorised by pore size, e.g. a maximum number of tetrahedral atoms present in a molecular sieve's framework. As defined herein, a "small pore" molecular sieve, such as CHA, contains a maximum ring size of eight tetrahedral atoms, whereas a "medium pore" molecular sieve, e.g. MFI, contains a maximum ring size of ten tetrahedral atoms; and a "large pore" molecular sieve, such as BEA, contains a maximum ring size of twelve tetrahedral atoms. Small and medium pore molecular sieves, especially small pore molecular sieves, are preferred for use in SCR catalysts, since they may, for example, provide improved SCR performance and/or improved hydrocarbon tolerance.

Molecular sieve catalysts may be metal-promoted. Examples of metal-promoted molecular sieve catalysts include iron-, copper- and palladium-promoted molecular sieve, where the metal may be loaded into the molecular sieve. In a metal-loaded molecular sieve, the loaded metal is a type of "extra-framework metal", that is, a metal that resides within the molecular sieve and/or on at least a portion of the molecular sieve surface and does not include atoms constituting the framework of the molecular sieve. Iron- and copper-loaded small and medium pore zeolites, for example, are known for use as SCR catalysts.

Several methods have been mentioned in the literature for preparing metal-loaded molecular sieves, in particular metal-loaded zeolites. The direct synthesis of metal-loaded zeolites is a complicated process and depends on the synthesis conditions (see M. Moliner, ISRN Materials Science, 2012, Article ID 789525). An alternative is to use a commercial zeolite support and to subsequently add metal by post-synthesis treatment of the zeolite, for example, by wet impregnation, wet ion exchange or solid-state ion exchange.

Known wet ion-exchange methods for the addition of metal to molecular sieves (e.g. zeolites) typically employ soluble metal salts, such as metal acetates, metal sulphates or metal chlorides, as the active metal precursor, wherein the active metal precursor is reacted with the molecular sieve in aqueous solution. In order to accelerate ion-exchange, such processes typically require a heating step, wherein the mixture may be heated to a temperature in the range 70 to 80° C. for up to several hours. Further, additional processing steps (e.g. filtering, evaporation, spray-drying, calcination etc) may be required before the resulting metal-loaded molecular sieve may be employed in an extrusion paste for the formation of an all-active extrudate. Further still, it has been found that where certain metal-acetates (e.g. copper acetate) are employed to prepare metal-loaded molecular sieves (e.g. metal-loaded zeolites) for use as SCR catalysts, any residual metal acetate remaining after calcination may have a poisoning effect on ammonia slip catalysts (ASCs) which are used downstream of or proximal to the SCR catalyst.

The present invention provides an improved process for the preparation of extruded catalyst articles which employ a metal-loaded small or medium pore crystalline molecular sieve as a catalytically active material.

According to a first aspect of the present disclosure there is provided a method for forming a catalyst article comprising:
    (a) forming a plastic mixture by mixing together at least the following components:
        (i) a crystalline small pore or medium pore molecular sieve in an $H^+$ or $NH_4^+$ form;
        (ii) an insoluble active metal precursor;

(iii) an inorganic matrix component;
(iv) an organic auxiliary agent;
(v) an aqueous solvent;
wherein the mixture has a solids content of greater than 50% by weight (based on the total weight of the mixture);
(b) moulding the plastic mixture into a shaped article; and
(c) calcining the shaped article to produce a solid catalyst body.

Advantageously, it has been found that the heat employed to calcine the shaped article may be exploited to promote metal loading onto the molecular sieve. Thus, the requirement for any heating steps during wet ion-exchange or impregnation processes and the requirement for expensive, high-temperature-resistant equipment may be avoided. Further, long reaction times typical in wet ion-exchange or impregnation processes and/or energy and labour-intensive processes such as spray-drying may be avoided. Consequently, the method according to the first aspect may be more energy efficient and economical.

Furthermore, it has been found that the mixture prepared in step (a) of the method according to the first aspect, may be employed directly as an extrusion paste without the need for any further processing steps. In particular, the method of the first aspect may reduce the overall water consumption in the manufacture of extruded catalysts comprising metal-loaded small or medium pore molecular sieves, since it is conventional to employ powdered forms of pre-loaded small/medium pore molecular sieves, which themselves were prepared via a wet process followed by drying and/or calcination.

Further still, it has been found that catalysts prepared via the process according to the first aspect may provide at least comparable SCR activity to catalysts comprising metal-loaded small/medium pore molecular sieves (e.g. metal-loaded zeolites) which were prepared via wet ion exchange or impregnation. Moreover, it has been found that poisoning of associated ammonia slip catalysts may be mitigated compared to SCR catalysts comprising metal-loaded crystalline molecular sieves which have been prepared using metal acetates as the active metal precursor.

According to a second aspect of the present disclosure, there is provided a catalyst article obtained or obtainable according to the method of the first aspect.

According to a third aspect of the present disclosure, there is provided an exhaust system comprising: a source of nitrogenous reductant and an injector for injecting a nitrogenous reductant into a flowing exhaust gas, wherein the injector is disposed upstream from a catalyst article according to the second aspect.

DETAILED DESCRIPTION

Figure 1:
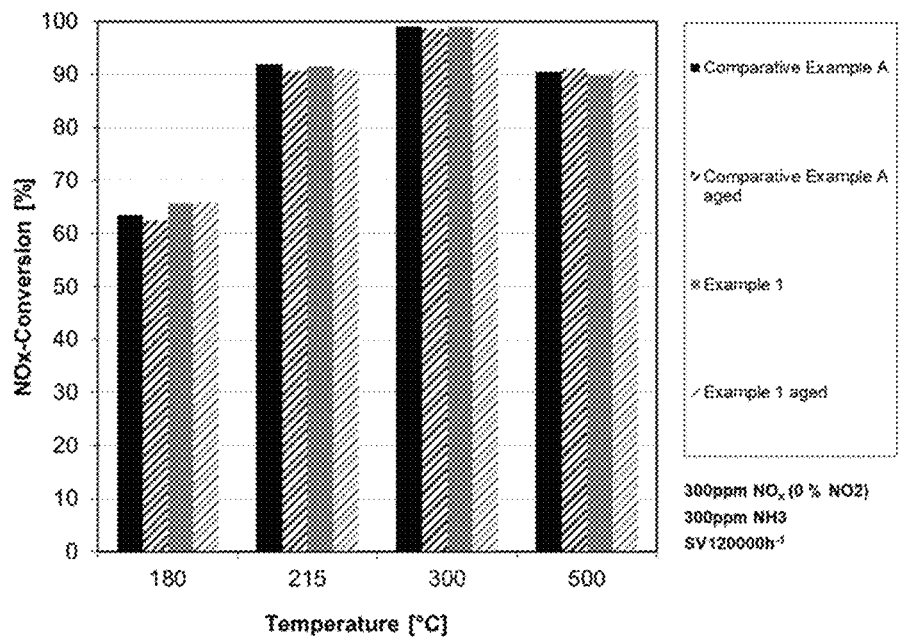
FIG. 1 is a graph showing $NO_x$ conversion achieved by a catalyst prepared according to the first aspect of the present disclosure compared with a catalyst prepared via a prior art method.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Further, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

A crystalline molecular sieve is typically composed of aluminium, silicon, and/or phosphorus. A crystalline molecular sieve generally has a three-dimensional arrangement (e.g. framework) of repeating $SiO_4$, $AlO_4$, and optionally $PO_4$, tetrahedral units that are joined by the sharing of oxygen atoms. A small pore molecular sieve has a maximum ring size of eight tetrahedral atoms. A medium pore molecular sieve has a maximum ring size of ten tetrahedral atoms.

The term "$H^+$-form" in relation to a molecular sieve refers to a molecular sieve having an anionic framework wherein the charge of the framework is counterbalanced by protons (i.e. $H^+$ cations).

The term "$NH_4^+$ form" in relation to a molecular sieve refers to a molecular sieve having an anionic framework wherein the charge of the framework is counterbalanced by ammonium cations ($NH_4^+$ cations).

When the crystalline molecular sieve has an aluminosilicate framework, then the molecular sieve is preferably a zeolite.

Where the crystalline molecular sieve is a small pore molecular sieve, the small pore molecular sieve may have a Framework Type selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, KFI, LEV, LTA, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably, the small pore molecular sieve has a Framework Type selected from the group of Framework Types consisting of AEI, AFT, AFX, CHA, DDR, ERI, KFI, LEV, LTA, SFW and RHO. More preferably, the small pore crystalline molecular sieve has a Framework Type that is AEI, AFX, CHA, LTA, ERI or AEI-CHA intergrowth.

Where the crystalline molecular sieve is a medium pore molecular sieve, the medium pore molecular sieve can be selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore crystalline molecular sieve is selected from the group of Framework Types consisting of FER, MEL, MFI, STI and STT.

Preferably, the crystalline molecular sieve is a small pore zeolite having the Framework Type CHA, AEI, AFX, LTA or ERI.

Where the crystalline molecular sieve is a zeolite, the zeolite may have a silica-to-alumina ratio (SAR) of 5 to 200, preferably 5 to 100, more preferably 10 to 80. For example, the zeolite may have a silica-to-alumina ratio (SAR) of 5 to 30.

Where the crystalline molecular sieve is a SAPO, the SAPO may have a silicon content in the range 5 to 30 wt %, preferably 8 to 16 wt % (based on total weight of the molecular sieve).

The crystalline small or medium pore molecular sieve is preferably a powdered crystalline molecular sieve (i.e. in particulate form), wherein the particles comprise individual crystals, agglomerations of crystals or a combination of both. The crystalline molecular sieve may have a mean crystal size, as measured by scanning electron microscopy (SEM), of ≥0.5, preferably between about 0.5 and about 15 μm, such as about 0.5 to 10 μm, about 0.5 to about 5 μm, about 1 to about 5 μm, or about 2 to about 5 μm.

The powdered crystalline molecular sieve preferably has a D90 particle size of less than about 30 μm. The powdered crystalline molecular sieve preferably has a D99 particle size of less than about 50 μm. The terms "D90 particle size" and "D99 particle size" as used herein refer to particle size distribution. A value for D90 particle size corresponds to the particle size value below which 90%, by volume, of the total particles in a particular sample lie. A value for D99 particle size corresponds to the particle size value below which 99%, by volume, of the total particles in a particular sample lie. The D90 and D99 particle sizes may be determined using a laser diffraction method (e.g. using a Malvern Mastersizer 2000).

If desired, prior to forming the plastic mixture in step a) of the method of the first aspect, the molecular sieve may undergo a particle size reduction treatment such as jet milling, wet milling or steam assisted jet-milling The components to be mixed together in step (a) of the first aspect may include two or more crystalline small or medium pore molecular sieves in an $H^{30}$ or $NH_4^+$ form. Consequently, the resulting solid catalyst body formed in step (c) may comprise two or more different types of metal-loaded molecular sieve.

As used herein "active metal precursor" refers to a metal species which is capable of supplying an extra-framework metal to the crystalline small pore or medium pore molecular sieve. The term "extra-framework metal", as used herein, refers to a metal that resides within the molecular sieve (i.e. within the micropore structure, either in an ion-exchange position or non-ion exchange position) and/or on at least a portion of the molecular sieve surface, (for example, in an ionic or oxide form), and does not include metal atoms of the tetrahedral units which constitute the framework of the molecular sieve. It will be understood that additional metal species may be present in the mixture formed in step (a) which would not themselves take part in metal-loading.

By "insoluble active metal precursor" it is meant an active metal precursor which is insoluble in water. In particular, the insoluble active metal precursor may have a water solubility of less than 1 g/100 ml, for example less than 0.1 g/100 ml or less than 0.01 g/100 ml. The property water solubility is a measure of the quantity of a material that will dissolve in a certain volume of water at a specified temperature and pressure to form a saturated solution. As used herein, the term "water solubility" in relation to the insoluble active metal precursor, means the quantity (in grams) of the insoluble active metal precursor which will dissolve in 100 millilitres of water (g/100 ml) at a temperature of 20° C. and a pressure of 1 atmosphere.

Suitable insoluble active metal precursors include certain metal salts. In particular, the insoluble active metal precursor may be a metal carbonate, a metal hydroxide or a metal oxalate.

The insoluble active metal precursor preferably comprises a metal salt which undergoes thermal decomposition by thermolysis at temperatures of less than 500° C.

The insoluble active metal precursor may comprise a salt of a transition metal, a salt of a noble metal or a salt of a rare earth metal. For example, the insoluble active metal precursor may comprise one or more salts of copper, manganese, nickel, cobalt, iron, palladium, platinum, cerium, yttrium, niobium, lanthanum, zinc, calcium, magnesium or any mixture of two or more thereof.

In particular, the insoluble active metal precursor may be selected from the group consisting of copper carbonate, manganese carbonate, nickel carbonate, cobalt carbonate, iron carbonate, palladium carbonate, platinum carbonate, cerium carbonate, yttrium carbonate, niobium carbonate, lanthanum carbonate, zinc carbonate, zirconium carbonate, calcium carbonate, magnesium carbonate, copper hydroxide, manganese hydroxide, nickel hydroxide, cobalt hydroxide, iron hydroxide, palladium hydroxide, platinum hydroxide, cerium hydroxide, yttrium hydroxide, niobium hydroxide, lanthanum hydroxide, zinc hydroxide, zirconium hydroxide, calcium hydroxide, magnesium hydroxide, copper oxalate, calcium oxalate, iron oxalate, manganese oxalate, cobalt oxalate, cerium oxalate, yttrium oxalate, zinc oxalate and any mixture of two or more thereof.

Preferably, the insoluble active metal precursor may comprise one or more of: copper (II) carbonate, copper (II) hydroxide, and copper oxalate. More preferably, the insoluble active metal precursor comprises copper (II) carbonate. In one example, the insoluble active metal precursor may comprise a mixture of copper (II) carbonate and cerium carbonate.

In addition to the insoluble active metal precursor, the components to be mixed together in step (a) may further include one or more soluble (i.e. soluble in water) active metal precursors. Suitable soluble active metal precursors may include metal acetates or metal nitrates or a mixture of any two or more thereof. In one example, the insoluble active metal precursor may comprise copper carbonate and the soluble active metal precursor may comprise cerium acetate.

The relative quantities of the molecular sieve and the insoluble active metal precursor employed in step (a) will depend on the targeted metal loading of the molecular sieve and the quantity of any soluble active metal precursors employed. Metal-loaded molecular sieve present in the solid body produced in step (c) may have a metal-loading of ≥0.1% to ≤10% by weight, preferably ≥0.1% and ≤7% by weight, more preferably ≥0.1% and ≤5% by weight.

In particular, wherein the crystalline small or medium pore molecular sieve is a zeolite, the relative quantities of the molecular sieve, the insoluble active metal precursor and any soluble active metal precursors employed in step (a) may be selected to provide a solid catalyst body comprising a metal-loaded zeolite having a metal to alumina ratio in the metal-loaded zeolite in the range 0.2 to 0.5, preferably in the range 0.3 to 0.5.

The term "aqueous solvent" as used herein refers to a solvent that contains water. Preferably, the aqueous solvent consists essentially of water. That is the aqueous solvent contains water but may also contain minor non-aqueous (e.g. organic or inorganic) impurities. The water may be deionised or demineralised water.

The plastic mixture formed in step (a) has a solids content of at least 50 wt %, preferably at least 60 wt %. By "solids content" it is meant the proportion of solid material present in the plastic mixture based on the total weight of the mixture. In particular, the plastic mixture may take the form of a paste. The solids content of the mixture is preferably in the range 60 to 80 wt %, more preferably in the range 70 to 80 wt %. For example, the solids content of the mixture may be about 75 wt %.

The inorganic matrix component may comprise an inert filler (also referred to as a permanent binder) which provides structural integrity and/or porosity to the final solid catalyst body. In the course of calcining, the inorganic matrix component may form sinter bridges to provide stiffness and mechanical strength in the solid catalyst body. Some inorganic matrix components can also contribute desirable properties to assist in manufacture. For example, clays are inherently plastic so their inclusion in the mixture formed in step (a) may enable or promote a desired level of plasticity.

Preferably, the inorganic matrix component comprises an alumina precursor, such as boehmite or bayerite, which forms alumina upon calcination. The inorganic matrix component preferably comprises boehmite.

Alternatively or additionally, the inorganic matrix component may comprise silica or a silica pre-cursor, for example, colloidal silica, silanes or polysiloxanes.

Alternatively or additionally, the inorganic matrix component may comprise a clay. Suitable clays include bentonites, fire clay, attapulgite, fullers earth, sepiolite, hectorite, smectite, kaolin, diatomaceous earth and mixtures of any two or more thereof.

Optionally, the components to be mixed together in step (a) may further include inorganic fibres. Suitable inorganic fibres may be selected from the group consisting of carbon fibres, glass fibres, metal fibres, boron fibres, alumina fibres, silica fibres, silica-alumina fibres, silicon carbide fibres, potassium titanate fibres, aluminium borate fibres and ceramic fibres. Advantageously, inorganic fibres can improve the mechanical robustness of the calcined product.

Organic auxiliary agents are used to improve processing or to introduce desirable attributes to the final solid catalyst body but are burnt out during the calcination step. Such materials can improve processing plasticity and/or introduce porosity in the solid catalyst body. Organic auxiliary agents suitable for use in step (a) of the first aspect may comprise at least one of acrylic fibres (extrusion aid and pore former), a cellulose derivative (plasticizer and/or drying aid), other organic plasticizers (e.g. polyvinyl alcohol (PVA) or polyethylene oxide (PEO)), a lubricant (extrusion aid) and a water-soluble resin.

In some embodiments, further catalytically active materials may be incorporated into the plastic mixture formed in step (a), for example, where it is desired that the catalyst article is multi-functional (i.e. performs more than one catalytic function).

The relative quantitative proportions of the components used in step (a) may be selected such that the plastic mixture has the required solids content and such that the solid catalyst body, after the organic auxiliary agent is burnt out, contains 55 to 85 weight %, preferably 60 to 85 weight % of metal-loaded molecular sieve and 20 to 40% by weight of inorganic matrix component (based on total weight of the solid catalyst body). The selection of appropriate quantities of starting materials is well within the capabilities of the skilled person. Preferably, the relative quantitative proportions of the components used in step (a) are selected such that the solid catalyst body produced in step (c) contains 60 to 85 weight % of metal loaded molecular sieve and 20 to 40 wt. % of inorganic matrix component and 0 to 10 wt. % of inorganic fibres (based on total weight of the solid catalyst body).

The plastic mixture formed in step (a) may, for example, comprise 25 to 70 wt. % crystalline small pore or medium pore molecular sieve in an $H^+$ or $NH^{4+}$ form; 0.06 to 8 wt. % insoluble active metal precursor; 12 to 33 wt. % inorganic matrix component; 0 to 8 wt. % inorganic fibres; and up to 15wt % organic auxiliary agent (based on total weight of the plastic mixture).

In step (a), the plastic mixture is formed by mixing together the components. Preferably, the mixture is substantially uniform, that is, the distribution of components throughout the mixture is substantially even. The components may be mixed by any suitable method. Preferably, the components are mixed by kneading.

Optionally, the pH of the plastic mixture may be adjusted by the addition of an acid or a base.

Step (a) may be carried out at ambient temperature. Preferably, step (a) is carried out at a temperature in the range 10 to 35° C., preferably in the range 10 to 30° C. For example, step (a) may be carried out at a temperature in the range 18 to 28° C.

A particular advantage of the present invention is that the plastic mixture formed in step a) may be used directly as an extrusion paste. Thus, the mixture formed in step a) may be employed directly in step b) without any additional processing steps.

In step (b), the mixture may be moulded via extrusion techniques well-known in the art. For example, the mixture may be moulded using an extrusion press or an extruder including an extrusion die.

Step (b) may be carried out at ambient temperature. Preferably, step (b) is carried out at a temperature in the range 10 to 35° C., preferably in the range 10 to 30° C. For example, step (b) may be carried out at a temperature in the range 18 to 28° C.

Most preferably steps (a) and (b) are both carried out at a temperature in the range 10 to 35° C., preferably 10 to 30° C., more preferably 18 to 28° C.

Preferably, the temperature of the plastic mixture does not exceed 35° C. prior to calcination in step (c). For example, the temperature of the plastic mixture may be maintained at ≤30° C., or ≤28° C. prior to calcination in step (c).

Preferably, the shaped article takes the form of a honeycomb monolith. The honeycomb body may have any convenient size and shape. Alternatively, the shaped article may take other forms, such as a plate or pellets.

The shaped article may undergo a drying process prior to calcination in step (c). Thus, the method of the first aspect may further comprise drying the shaped article formed in step (b) prior to carrying out step (c). Drying of the shaped article may be carried out, via standard techniques, including freeze drying and microwave drying (for example, see WO2009/080155).

In step (c) of the first aspect, the (optionally dried) shaped article formed in step (b) undergoes calcination to form the solid catalyst body. The term "calcine" or "calcination" refers to a thermal treatment step. Calcination causes solidification of the shaped article by removal of any remaining solvent as well as the removal (e.g. by burning) of the organic auxiliary agent.

Without wishing to be bound by theory, it is believed that, surprisingly, at least some metal-loading of the small or medium pore molecular sieve occurs during calcination of the shaped article. For example, it is possible that a solid-state ion-exchange takes place during calcination.

Calcination of the shaped article may be carried out via techniques well known in the art. In particular, calcination may be carried out statically or dynamically (for example, using a belt furnace).

Where the shaped article takes the form of a honeycomb monolith, a flow-through calcination technique may be employed, where heated gas is directed through the channels of the honeycomb.

Preferably, calcination step (c) is carried out at temperatures in the range 500 to 900° C., preferably 600 to 800° C.

Preferably, the shaped article is calcined for up to 5 hours, preferably 1 to 3 hours.

The calcination carried out in step (c) may comprise multiple thermal treatment steps, for example, the shaped article may be subjected to a first thermal treatment at a first temperature, and then subjected to a second thermal treatment at a second temperature.

Calcination may, for example, be carried out under a reducing atmosphere or an oxidizing atmosphere. Where multiple thermal treatment steps are employed, the different steps may be carried out under different atmospheres.

The catalyst article according to the second aspect of the present disclosure may be employed for treating a flow of a combustion exhaust gas. That is, the catalyst article can be used to treat an exhaust gas derived from a combustion process, such as from an internal combustion engine (whether mobile or stationary), a gas turbine or a power plant (such as a coal or oil-fired power plant). A preferred application for the catalyst article of the present disclosure is in an exhaust system for an automotive vehicle. In particular, the catalyst article may be employed as an SCR catalyst.

In some embodiments, for example, where it is desired that the catalyst article is multi-functional (i.e. it simultaneously performs more than one catalytic function), the method may include a further step of applying a catalytic washcoat to the catalyst article. Thus, the method of the first aspect may further comprise step (d) coating the solid catalyst body produced in step (c) with a composition comprising catalytically active material. For example, the composition may comprise an SCR catalyst and/or an ammonia slip catalyst (ASC). Such a washcoating step may be carried out according to processes well known in the art.

The catalyst article may be configured as a flow through honeycomb monolith, wherein each channel is open at both ends and the channels extend through the entire axial length of the substrate. Alternatively, the catalyst article may be configured as a filter substrate, in which some channels are plugged at one end of the article and other channels are plugged at the opposite end. Such an arrangement has become known in the art as a wall-flow filter. The formation of a wall flow filter may be effected by means of suitable setting of the porosity of the catalyst article. Porosity of the final catalyst article may be controlled, for example, by the incorporation of organic pore-former components in the organic auxiliary agent employed in step (a) of the first aspect.

The catalyst article may be part of an emission gas treatment system wherein the catalyst article is disposed downstream of a source of a nitrogenous reductant.

EXAMPLES

The present disclosure will now be further described with reference to the following examples, which are illustrative, but not limiting of the invention.

Comparative Example A

Powdered copper-exchanged SSZ-39 (AEI) zeolite (which had been pre-prepared via a wet ion-exchange process followed by spray-drying and calcination) was mixed with clay minerals, powdered synthetic boehmite alumina (Pural® SB) and glass fibres (CP160, obtainable from MUHLMEIER) and then admixed in an aqueous solution with a pH-value of 4 with carboxy methyl cellulose, a plasticizer/extrusion aid (Zusoplast, a mixture of oleic acid, glycols, acids and alcohols—a brand name of Zschimmer & Schwarz GmbH & Co KG) and a polyethylene oxide (Alkox® PEO) at room temperature to form a mouldable paste. The mouldable paste had a solids content of 64wt. %. The quantitative proportions of the starting materials were selected such that final solid catalyst body contained 65% by weight of the copper-exchanged zeolite, 25% by weight of $\gamma$-$Al_2O_3$ and clay minerals and 10% by weight of glass fibres.

The mouldable paste was extruded at 20° C. into a flow-through honeycomb having a circular cross-section of 1 inch diameter and a cell density of 600 cpsi (cells per square inch). The extruded honeycomb was freeze dried for several hours at 2 mbar according to the method described in WO 2009/080155 and then calcined at a temperature of 600° C. in a lab scale muffle oven to form a solid catalyst body.

Example 1

A mouldable paste was prepared according to the method employed in Comparative Example A except that, instead of a pre-exchanged-copper-zeolite, the corresponding $H^+$-form of the zeolite and copper carbonate ($CuCO_3.Cu(OH)_2$) were employed. All other components employed in the paste preparation were the same. The quantity of copper carbonate was selected to give an equivalent wt % of copper as provided by the Cu-exchanged zeolite employed in Comparative Example A. The quantitative proportions of the starting materials were selected to provide a final solid catalyst body containing 65% by weight of copper and zeolite, 25% by weight of $\gamma$-$Al_2O_3$ and clay minerals and 10% by weight of glass fibres. The mouldable paste was then extruded into a flow-through honeycomb having the same shape and dimensions as that of the Comparative Example, which was then dried and calcined in the same way to form a solid catalyst body.

Example 2

A solid catalyst body was prepared according to the method described for Example 1, except that copper hydroxide ($Cu(OH)_2$) was employed instead of copper carbonate.

Comparative Example B

A solid catalyst body was prepared according to the method described for Example 1 except copper nitrate (Cu(NO$_3$)$_2$) (i.e. a soluble active metal precursor) was employed instead of copper carbonate.

Example 3

A solid catalyst body was prepared according to the method described for Example 1, except that SSZ-13 (CHA) in H$^+$-form was employed as the zeolite.

Catalyst Testing

Identical volume samples of Comparative Example A and Example 1 were tested in a synthetic catalytic activity test (SCAT) apparatus using the following inlet gas mixture at selected inlet gas temperatures: 300 ppm NO (0% NO$_2$), 300 ppm NH$_3$ (Ammonia to NOx ratio (ANR)=1.0), 9.3% O$_2$, 7% H$_2$O, balance N$_2$, space velocity (SV) of 120000 h$^{-1}$. The catalyst samples were tested both in a fresh condition and after hydrothermal ageing (10 vol. % H$_2$O for 50 h at 650° C.).

Figure 2:
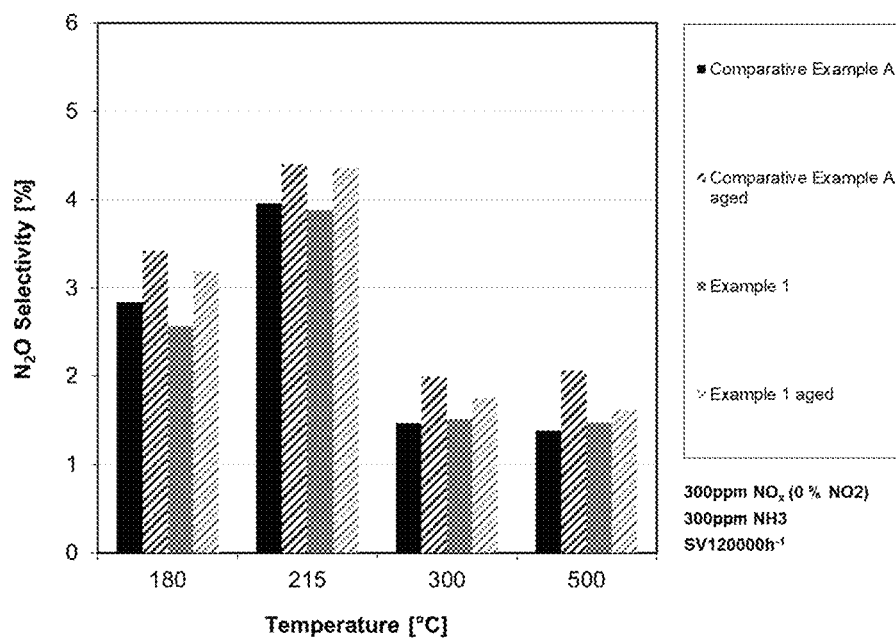
FIG. 2 is a graph showing $N_2O$ selectivity activity achieved by a catalyst prepared according to the first aspect of the present disclosure compared with a catalyst prepared via a prior art method.

The results are shown in FIGS. 1 and 2.

FIG. 1 shows NO$_x$ conversion rates achieved by each sample at the selected inlet temperatures, and FIG. 2 shows N$_2$O selectivity activity achieved by each sample at the selected inlet temperatures.

As demonstrated by the data shown in FIGS. 1 and 2, Example 1 achieves similar or slightly better NOx conversion rates and similar N$_2$O selectivity compared to Comparative Example A. The comparable catalytic performance indicates that the catalyst body prepared in Example 1 comprises a Cu-loaded zeolite and that the copper-loading achieved is similar to that of the powdered pre-exchanged zeolite employed in Comparative Example A.

Advantageously, the preparation of Example 1 required fewer process steps and reduced water and energy consumption compared to the overall preparation of Comparative Example A.

Identical volume samples of Examples 2 and 3 and Comparative Example B in a fresh condition were tested in a synthetic catalytic activity test (SCAT) apparatus at the same conditions described above.

Figure 3:
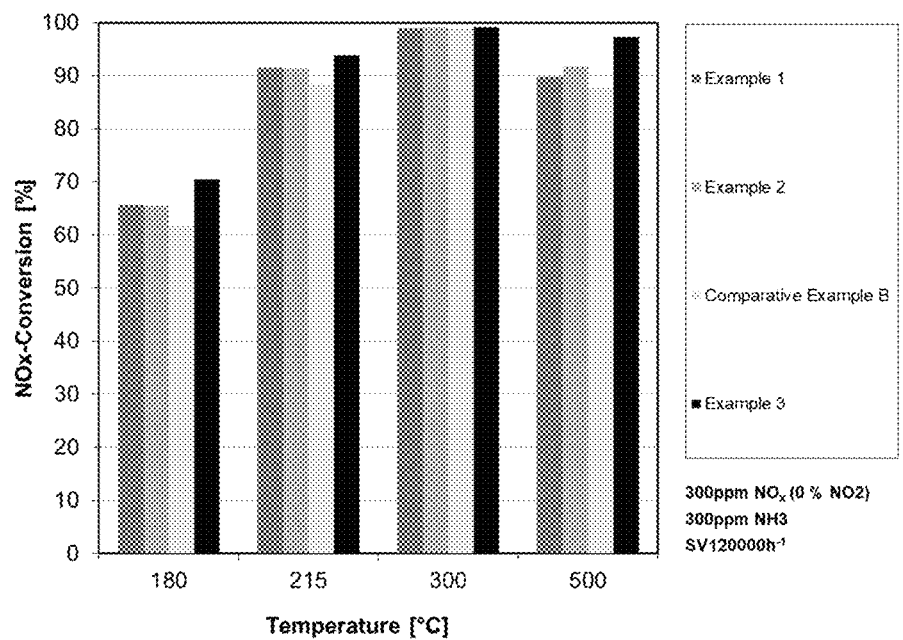
FIG. 3 is a graph showing $NO_x$ conversion achieved by catalysts prepared according to the first aspect of the present disclosure compared with a catalyst prepared using a soluble active metal precursor.
Figure 4:
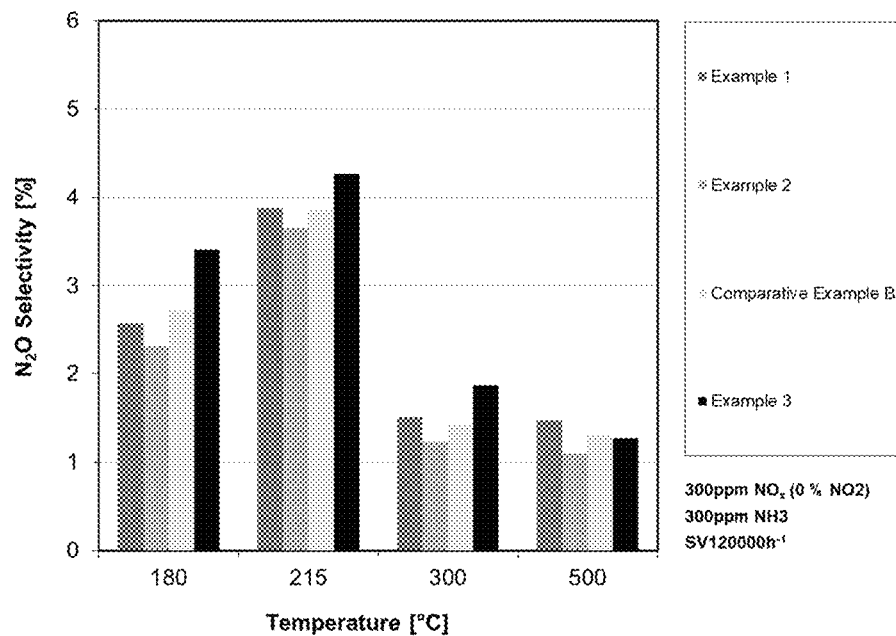
FIG. 4 is a graph showing $N_2O$ selectivity activity achieved by catalysts prepared according to the first aspect of the present disclosure compared with a catalyst prepared using a soluble active metal precursor.

The results are shown in FIGS. 3 and 4. For comparison purposes, the results generated for Example 1 in a fresh condition are also reproduced in FIGS. 3 and 4.

Further aspects and embodiments of the present disclosure are set out in the following numbered clauses:

Clause 1. A method for forming a catalyst article comprising:
 (a) forming a plastic mixture by mixing together at least the following components:
  (i) a crystalline small pore or medium pore molecular sieve in an H$^+$ or NH$_4^+$ form;
  (ii) an insoluble active metal precursor;
  (iii) an inorganic matrix component;
  (iv) an organic auxiliary agent;
  (v) an aqueous solvent;
  wherein the mixture has a solids content of greater than 50% by weight;
 (b) moulding the plastic mixture into a shaped article; and
 (c) calcining the shaped article to form a solid catalyst body.

Clause 2. A method as defined in clause 1 wherein in step (a) the components to be mixed together further include: (vi) inorganic fibres.

Clause 3. A method for forming a catalyst article comprising:
 (a) forming a plastic mixture by mixing together the following components:
  (i) a crystalline small pore or medium pore molecular sieve in an H$^+$ or NH$_4^+$ form;
  (ii) an insoluble active metal precursor;
  (iii) an inorganic matrix component;
  (iv) an organic auxiliary agent;
  (v) an aqueous solvent;
  (vi) optional inorganic fibres;
  wherein the mixture has a solids content of greater than 50% by weight;
 (b) moulding the plastic mixture into a shaped article; and
 (c) calcining the shaped article to form a solid catalyst body.

Clause 4. A method for forming a catalyst article consisting of:
 (a) forming a plastic mixture by mixing together the following components:
  (i) an insoluble active metal precursor;
  (ii) an inorganic matrix component;
  (iii) an organic auxiliary agent;
  (iv) an aqueous solvent;
  (v) optional inorganic fibres;
  wherein the plastic mixture has a solids content of greater than 50% by weight;
 (b) moulding the plastic mixture into a shaped article; and
 (c) calcining the shaped article to form a solid catalyst body; wherein subsequent to step (b) and prior to step (c) the shaped article is optionally dried.

Clause 5. A method as defined in any preceding clause wherein the relative quantitative proportions of the components used in step (a) are selected such that the solid catalyst body formed in step (c) contains 55 to 85 weight % of metal-loaded molecular sieve and 20 to 40% by weight of inorganic matrix component and 0 to 10 wt. % of inorganic fibres.

Clause 6. A method as defined in any preceding clause wherein the relative quantitative proportions of the components used in step (a) are selected such that the solid catalyst body formed in step (c) contains 60 to 85 weight % of metal-loaded molecular sieve and 20 to 40% by weight of inorganic matrix component and 0 to 10 wt. % of inorganic fibres.

Clause 7. A method as defined in any preceding clause wherein the plastic mixture formed in step (a) comprises 25 to 70 wt. % crystalline small pore or medium pore molecular sieve in an H$^+$ or NH$^{4+}$ form; 0.06 to 8 wt. % insoluble active metal precursor; 12 to 33 wt. % inorganic matrix component; 0 to 8 wt % inorganic fibres; and up to 15wt % organic auxiliary agent (based on total weight of the plastic mixture).

Clause 8. A method as defined in any preceding clause wherein the crystalline molecular sieve is a small pore molecular sieve.

Clause 9. A method as defined in clause 8 wherein the small pore molecular sieve has a Framework Type selected from AEI, AFT, AFX, CHA, DDR, ERI, KFI, LEV, LTA, SFW and RHO.

Clause 10. A method as defined in any preceding clause wherein the crystalline molecular sieve is a small pore zeolite having a Framework Type selected from CHA, AEI or AFX, LTA or ERI, preferably selected from CHA or AEI.

Clause 11. A method as defined in any preceding clause, wherein the crystalline molecular sieve is a zeolite having a silica-to-alumina ratio (SAR) of 5 to 200, 5 to 100, 10 to 80, or 5 to 30.

Clause 12. A method as defined in any preceding clause wherein the crystalline molecular sieve is in particulate form and has D90 particle size of less than 30 μm.

Clause 13. A method as defined in any preceding clause wherein the crystalline molecular sieve is in particulate form and has D99 particle size of less than 50 μm.

Clause 14. A method as defined in any preceding clause wherein component (i) comprises two or more small or medium pore crystalline molecular sieves in an $H^+$ or $NH_4^+$ form.

Clause 15. A method as defined in any preceding clause wherein the insoluble active metal precursor has a water solubility of less than 1 g/100 ml, less than 0.1 g/100 ml, or less than 0.01 g/100 ml.

Clause 16. A method as defined in any preceding clause wherein the insoluble active metal precursor is selected from a metal carbonate, a metal hydroxide, a metal oxalate or mixtures of any two or more thereof.

Clause 17. A method as defined in any preceding clause wherein the insoluble active metal precursor comprises a salt of copper, manganese, nickel, cobalt, iron, palladium, platinum, cerium, yttrium, niobium, lanthanum, zinc, calcium, magnesium or any mixture of two or more thereof.

Clause 18. A method as defined in any preceding clause wherein the insoluble active metal precursor is selected from the group consisting copper carbonate, manganese carbonate, nickel carbonate, cobalt carbonate, iron carbonate, palladium carbonate, platinum carbonate, cerium carbonate, yttrium carbonate, niobium carbonate, lanthanum carbonate, zinc carbonate, zirconium carbonate, calcium carbonate, magnesium carbonate, copper hydroxide, manganese hydroxide, nickel hydroxide, cobalt hydroxide, iron hydroxide, palladium hydroxide, platinum hydroxide, cerium hydroxide, yttrium hydroxide, niobium hydroxide, lanthanum hydroxide, zinc hydroxide, zirconium hydroxide, calcium hydroxide, magnesium hydroxide, copper oxalate, calcium oxalate, iron oxalate, manganese oxalate, cobalt oxalate, cerium oxalate, yttrium oxalate, zinc oxalate and any mixture of two or more thereof.

Clause 19. A method as defined in any preceding clause wherein the insoluble active metal precursor comprises one or more of copper (II) carbonate, copper (II) hydroxide, and copper oxalate.

Clause 20. A method as defined in any preceding clause wherein the insoluble active metal precursor comprises copper (II) carbonate.

Clause 21. A method as defined in any preceding clause wherein the insoluble active metal precursor comprises a mixture of copper (II) carbonate and cerium carbonate.

Clause 22. A method as defined in any preceding clause wherein the insoluble active metal precursor comprises one or more metal salts which undergo thermal decomposition by thermolysis at temperatures of less than 500° C.

Clause 23. A method as defined in any preceding clause wherein in step (a) the components to be mixed together further include: (vii) a soluble active metal precursor.

Clause 24. A method as defined in any preceding clause wherein the aqueous solvent consists essentially of water.

Clause 25. A method as defined in any preceding clause wherein the aqueous solvent is water.

Clause 26. A method as defined in any preceding clause wherein the plastic mixture formed in step (a) has a solids content of at least 60 wt %.

Clause 27. A method as defined in any preceding clause wherein the plastic mixture formed in step (a) has a solids content in the range 60 to 80 wt %, more preferably in the range 70 to 80 wt %.

Clause 28. A method as defined in any preceding clause wherein the inorganic matrix component comprises boehmite and/or bayerite, preferably boehmite.

Clause 29. A method as defined in any preceding clause wherein the inorganic matrix component comprises a clay.

Clause 30. A method as defined in clause 29 wherein the clay is selected from bentonites, fire clay, attapulgite, fullers earth, sepiolite, hectorite, smectite, kaolin, diatomaceous earth and mixtures of any two or more thereof.

Clause 31. A method as defined in any preceding clause, wherein in step (a) the components to be mixed together further include: (vi) inorganic fibres, and wherein the inorganic fibres comprise one or more of carbon fibres, glass fibres, metal fibres, boron fibres, alumina fibres, silica fibres, silica-alumina fibres, silicon carbide fibres, potassium titanate fibres, aluminium borate fibres, ceramic fibres.

Clause 32. A method as defined in any preceding clause wherein the organic auxiliary agent comprises at least one of acrylic fibres, a cellulose derivative, organic plasticizers, a lubricant and a water-soluble resin.

Clause 33. A method as defined in any preceding clause wherein in step (a) the components are mixed together by kneading.

Clause 34. A method as defined in any preceding clause wherein step (a) is carried out at ambient temperature.

Clause 35. A method as defined in any of clauses 1 to 33 wherein step (a) is carried out at a temperature in the range 10 to 35° C., in the range 10 to 30° C. or in the range 18 to 28° C.

Clause 36. A method as defined in any preceding clause wherein the plastic mixture formed in step a) is employed directly in step b) without any additional processing steps.

Clause 37. A method as defined in any preceding clause wherein step (b) is carried out via extrusion.

Clause 38. A method as defined in any preceding clause wherein step (b) is carried out at ambient temperature.

Clause 39. A method as defined in any of clauses 1 to 37 wherein step (b) is carried out at a temperature in the range 10 to 35° C., in the range 10 to 30° C. or in the range 18 to 28° C.

Clause 40. A method as defined in any preceding clause wherein the temperature of the plastic mixture does not exceed 35° C., preferably does not exceed 30° C., more preferably does not exceed 28° C. prior to calcination in step (c).

Clause 41. A method as defined in any preceding clause wherein the shaped article is a honeycomb monolith.

Clause 42. A method as defined in any preceding clause, which method further comprises drying the shaped article formed in step (b) prior to step (c).

Clause 43. A method as defined in any preceding clause wherein step (c) is carried out at a temperature in the range 500 to 900° C., preferably in the range 600 to 800° C.

Clause 44. A method as defined in any preceding clause wherein in step (c) calcination is carried out for a period of up to 5 hours, preferably 1 to 3 hours.

Clause 45. A method as defined in any preceding clause, wherein the solid catalyst body formed in step (c) comprises a metal-loaded molecular sieve.

Clause 46. A method as defined in any preceding clause wherein the solid catalyst body formed in step (c) comprises a metal-loaded molecular sieve which is catalytically active for SCR.

Clause 47. A method as defined in any preceding clause, wherein during step (c) at least some metal-loading of the molecular sieve occurs.

Clause 48. A catalyst article obtained or obtainable by the method as defined in any preceding clause.

Clause 49. A catalyst article as defined in clause 48 which is configured as a flow-through honeycomb monolith or a wall-flow filter.

Clause 50. A catalyst article as defined in clause 48 or 49 which is catalytically active for SCR.

Clause 51. An exhaust system comprising: a source of nitrogenous reductant and an injector for injecting a nitrogenous reductant into a flowing exhaust gas, wherein the injector is disposed upstream from a catalyst article as defined in clause 50.

For the avoidance of any doubt, the entire content of any and all documents cited herein is incorporated by reference into the present application.

The invention claimed is:

1. A method for forming a catalyst article comprising:
   (a) forming a plastic mixture by mixing together at least the following components:
      (i) a crystalline small pore or medium pore molecular sieve in an $H^+$ or $NH_4^+$ form;
      (ii) an insoluble active metal precursor;
      (iii) an inorganic matrix component;
      (iv) an organic auxiliary agent;
      (v) an aqueous solvent;
   wherein the mixture has a solids content of greater than 50% by weight; wherein the insoluble active metal precursor is selected from the group consisting copper carbonate, manganese carbonate, nickel carbonate, cobalt carbonate, iron carbonate, palladium carbonate, platinum carbonate, cerium carbonate, yttrium carbonate, niobium carbonate, lanthanum carbonate, zinc carbonate, zirconium carbonate, calcium carbonate, magnesium carbonate, manganese hydroxide, nickel hydroxide, cobalt hydroxide, iron hydroxide, palladium hydroxide, platinum hydroxide, cerium hydroxide, yttrium hydroxide, niobium hydroxide, lanthanum hydroxide, zinc hydroxide, zirconium hydroxide, calcium hydroxide, manganesium hydroxide, copper oxalate, calcium oxalate, iron oxalate, manganese oxalate, cobalt oxalate, cerium oxalate, yttrium oxalate, zinc oxalate and any mixture of two or more thereof; and,
   wherein step (a) is carried out at a temperature in the range 10 to 35° C.;
   (b) moulding the plastic mixture into a shaped article; and
   (c) calcining the shaped article to form a solid catalyst body.

2. The method as claimed of claim 1, wherein in step (a) the components to be mixed together further include: (vi) inorganic fibres.

3. The method of claim 2 wherein, the crystalline molecular sieve is a small pore zeolite having a Framework Type selected from CHA, AEI or AFX, LTA or ERI.

4. The method of claim 2, wherein the insoluble active metal precursor comprises one or more of copper (II) carbonate, and copper oxalate.

5. The method of claim 2, wherein the plastic mixture formed in step (a) has a solids content of at least 60 wt %.

6. The method of claim 1, wherein the relative quantitative proportions of the components used in step (a) are selected such that the solid catalyst body formed in step (c) contains 60 to 85 weight % of metal-loaded molecular sieve, 20 to 40% by weight of matrix component and 0 to 10 wt. % of inorganic fibres.

7. The method of claim 1, wherein the crystalline molecular sieve is a small pore zeolite having a Framework Type selected from CHA, AEI or AFX, LTA or ERI.

8. The method of claim 1 wherein the insoluble active metal precursor comprises one or more of copper (II) carbonate, copper oxalate.

9. The method of claim 1 wherein the aqueous solvent is water.

10. The method of claim 1 wherein the plastic mixture formed in step (a) has a solids content of at least 60wt %.

11. The method of claim 1 wherein the inorganic matrix component comprises an alumina precursor and/or a clay.

12. The method of claim 1 wherein the organic auxiliary agent comprises at least one of acrylic fibres, a cellulose derivative, organic plasticizers, a lubricant and a water-soluble resin.

13. The method of claim 1, wherein step (b) is carried out at a temperature in the range 10 to 35° C.

14. The method of claim 1, wherein the plastic mixture formed in step a) is employed directly in step b) without any additional processing steps.

15. The method of claim 1, wherein the insoluble active metal precursor comprises copper (II) carbonate.

* * * * *